US006028596A

United States Patent [19]
Oka

[11] Patent Number: 6,028,596
[45] Date of Patent: Feb. 22, 2000

[54] IMAGE CREATION APPARATUS

[75] Inventor: Toshinari Oka, Kobe, Japan

[73] Assignee: Konami Co, Ltd., Hyogo-ken, Japan

[21] Appl. No.: 08/667,106

[22] Filed: Jun. 20, 1996

[30] Foreign Application Priority Data

Jun. 23, 1995 [JP] Japan .................................... 7-179633

[51] Int. Cl.[7] ........................................ G06T 9/00
[52] U.S. Cl. ........................................ 345/202; 345/509
[58] Field of Search .................................... 345/507, 186, 345/510, 509, 515–517, 508, 511, 202, 203, 433, 473–475, 112–114, 121, 123, 125, 127, 131, 149, 152, 339, 348, 349

[56] References Cited

U.S. PATENT DOCUMENTS

| | | | |
|---|---|---|---|
| 5,319,786 | 6/1994 | Yamamura | 345/115 |
| 5,453,763 | 9/1995 | Nakagawa et al. | 345/192 |
| 5,459,485 | 10/1995 | Tomita et al. | 345/150 |
| 5,560,614 | 10/1996 | Ueda et al. | 345/114 |
| 5,594,473 | 1/1997 | Miner et al. | 345/199 |
| 5,608,424 | 3/1997 | Takahashi et al. | 345/141 |
| 5,708,457 | 1/1998 | Otake et al. | 345/114 |

FOREIGN PATENT DOCUMENTS

| | | |
|---|---|---|
| 215428 | 3/1987 | European Pat. Off. . |
| 284904 | 10/1988 | European Pat. Off. . |
| 487266 | 5/1992 | European Pat. Off. . |
| 5027747 | 2/1993 | Japan . |
| 6102855 | 4/1994 | Japan . |
| 9501629 | 1/1995 | WIPO . |

*Primary Examiner*—Ulka J. Chauhan
*Attorney, Agent, or Firm*—Jordan and Hamburg LLP

[57] ABSTRACT

An image creation apparatus is connected with a display device on which a plurality of pixels are arranged in matrix form. The image creation apparatus comprising:

a video memory having addresses corresponding to the individual pixels of said display device;

a dot pattern data memory for storing common dot pattern data regarding each of a plurality of common dot pattern consisting of a plurality of pixels;

an image creator for reading common dot pattern data in the unit of common dot pattern from the dot pattern data memory and writing the common dot pattern data in the video memory in accordance with a predetermined image creation program to create an image on the screen of the display device.

11 Claims, 7 Drawing Sheets

IMAGE CREATION APPARATUS

BACKGROUND OF THE INVENTION

The present invention relates to an image creation apparatus for presenting images on a display device on which a plurality of picture elements, or pixels, are arranged in matrix form.

An example of this type of image creation apparatus is a personal computer complying with an industrial standard known as "MSX" (a trademark for a computer hardware and software standard). A video game image presented by this personal computer is essentially a group of dot patterns called "characters," (or dot pattern) each composed of 8×8 pixels, for instance. A video random access memory (hereinafter referred to as the VRAM) employed by the personal computer is of a so-called character-generation type suitable for displaying such characters.

As example of the character-generation type VRAM has physically partitioned first and second memory areas for storing, respectively, character image data which defines 256 kinds of dot patterns, or characters, and screen data which determines at which on-screen locations of a display device individual character images generated from the character image data are displayed. The character image data for creating up to 256 kinds of dot patterns and initial screen data are read from an external storage medium such as a read-only memory (hereinafter referred to as the ROM) cassette and written into the VRAM at the beginning of a game or at the end of a stage, or a particular sequence of events, during the game, for instance. When the screen data is updated by a control circuit in accordance with the progress of the game, characters (dot patterns) designated by the screen data are read from the VRAM and displayed at specified locations on a screen of the display device through a hardware-driven process. A virtual display screen created in the VRAM to cover the screen of the display device is divided into segments, each matching the size of a single character (or a single dot pattern). This means that on-screen images can only be rewritten in the unit of the character size.

An image creation apparatus proposed in recent years allows an operator to produce an image by using a coordinate input device like a tablet and to present the image on a screen of a display device such as a home television set, for instance. Since this image creation apparatus displays precise images including line drawings, it employs a VRAM suitable for such applications. Specifically, the VRAM used in the image creation apparatus has addresses corresponding to individual pixels of the display device and allows color specification for the individual addresses so that display colors can be specified for the individual pixels of the display device. This type of VRAM is referred to as a bit-map type VRAM.

When the bit-map type VRAM is used for presenting images on the display device, a control circuit is provided with a capability to write color specification data in individual addresses of the VRAM and switch display pages.

In the conventional image creation apparatus employing the bit-map type VRAM, it is essential to write full-screen pixel data in the VRAM to display a desired screen image. This means that an enormous amount of image data is required for displaying a wide variety of images or an extremely large-sized image on a screen. On the other hand, the image creation apparatus is limited in image data storage capacity since its program data and image data are supplied in the form of an IC memory card to ensure portability and ease of handling. It has therefore been difficult in the aforementioned image creation apparatus to present such a wide variety of images or an extremely large-sized image which exceeds the storage capacity of the IC memory card.

SUMMARY OF THE INVENTION

The present invention is directed to the aforementioned problems of the prior art. Accordingly, it is an object of the invention to provide an image creation apparatus which can present a wide variety of images or an extremely large-sized image by use of a bit-map type VRAM.

According to the invention, an image creation apparatus connected with a display device on which a plurality of pixels are arranged in matrix form comprises:

- a video memory having addresses corresponding to the individual pixels of said display device;
- a dot pattern data memory for storing common dot pattern data regarding each of a plurality of common dot pattern consisting of a plurality of pixels;
- an image creator for reading common dot pattern data in the unit of common dot pattern from the dot pattern data memory and writing the common dot pattern data in the video memory in accordance with a predetermined image creation program to create an image on the screen of the display device.

In this image creation apparatus, the common dot pattern data once read by the image creator can be written in appropriate video memory addresses according to the predetermined image creation program. This means that the same dot pattern data can be written, according to the predetermined image creation program, in more than one video memory address when it is required to do so. Therefore, if the image to be displayed on the screen contains a plurality of area segments to be painted in the same color and dot pattern, these segments may be assigned a common dot pattern data. This feature of this invention makes it possible to reduce the number of dot pattern data to be stored in the dot pattern memory. This in turn allows to minimize the number of dot pattern data needed to be stored in the dot pattern data memory for creating the image on the screen on the display device. As a result, it allows the image creation apparatus to produce greater variety of images or an image having an increased area coverage despite the fact that a data storage capacity of the dot pattern memory is limited as it is usually provided in the form of IC memory card.

In another aspect of the invention, the dot pattern data memory further stores arrangement data indicating a storing arrangement of the common dot pattern data and the image creator includes a reader for reading common dot pattern data from the dot pattern data memory with reference to the arrangement data.

In still another aspect of the invention, the arrangement data are dot pattern address data designating addresses in which the common dot pattern data are stored.

With the aforementioned features of the invention, required dot pattern data can be promptly located in the dot pattern data memory. It enhances a reading performance of the reader.

In another aspect of the invention, the dot pattern data memory is arranged in the form of a replaceable storage member. And the replaceable storage member can be an IC memory card.

With this feature of the invention, it makes it possible to use various kinds of sets of dot pattern data. It certainly allows user to handle such data memory with great ease.

In yet another aspect of the invention, the image creation program includes screen data indicating at which addresses in the video memory the common data sets are to be written and the image creator further includes a writer for writing the common dot pattern data in the video memory in accordance with the screen data.

With this feature of the invention, the image creation program includes not only dot pattern arrangement data but also the screen data for writing the dot pattern data at the specified position in the video memory. Accordingly the common dot pattern data can be read and written in accordance with the image creation program thus the processing the common dot data can be easily carried out. Furthermore, it makes it possible to replace the data creation program with other program while keeping the stored dot pattern data in the dot pattern data memory.

In yet another aspect of the invention, the dot pattern data memory stores the common dot pattern data on a compressed state and the reader reads the common data in a compressed state, and the writer decompresses the dot pattern data read by the reader and writes the decompressed the common dot pattern data in the video memory.

With this feature of the invention, the reader reads the common dot pattern data in its compressed state therefore, it makes it possible to reduce the memory of the reader occupied by the data.

In yet another aspect of the invention, the reader reads the common dot pattern data stored in the dot pattern data memory twice or more in the event that the common dot pattern data is repeatedly written in the video memory in accordance with the screen data.

In yet another aspect of the invention, the dot pattern data memory further stores uncommon dot pattern data wherein the common dot pattern data is read more than twice and the uncommon dot pattern data is read once in accordance with the screen data. In other words, the dot pattern data memory can be also set such that one arbitrary chosen dot pattern data stored in the dot pattern data memory is different from the rest of the dot pattern data stored in the dot pattern data memory.

With the aforementioned features of this invention, it makes it certainly possible to minimize the number of the dot pattern data needed to create the image on the screen of the display device. In other words, it maximizes the number of the common dot pattern data, it in turn makes it possible to best utilize the storage capacity of the dot pattern data memory.

In another aspect of the invention, the dot pattern is made of n times n pixels where n is 16.

With this feature of the invention, the dot pattern data can be easily arranged in the video memory. And the time required to process image on the screen can be greatly reduced as the dot pattern data consisting of 16 times 16 pixels is treated as a single data set.

These and other objects, features and advantages of the present invention will more fully be understood upon reading the following detailed description in conjunction with the accompanying drawings.

DETAILED DESCRIPTION OF THE PREFERRED EMBODIMENT OF THE INVENTION

The invention will now be described in detail with reference to the accompanying drawings.

Figure 1:
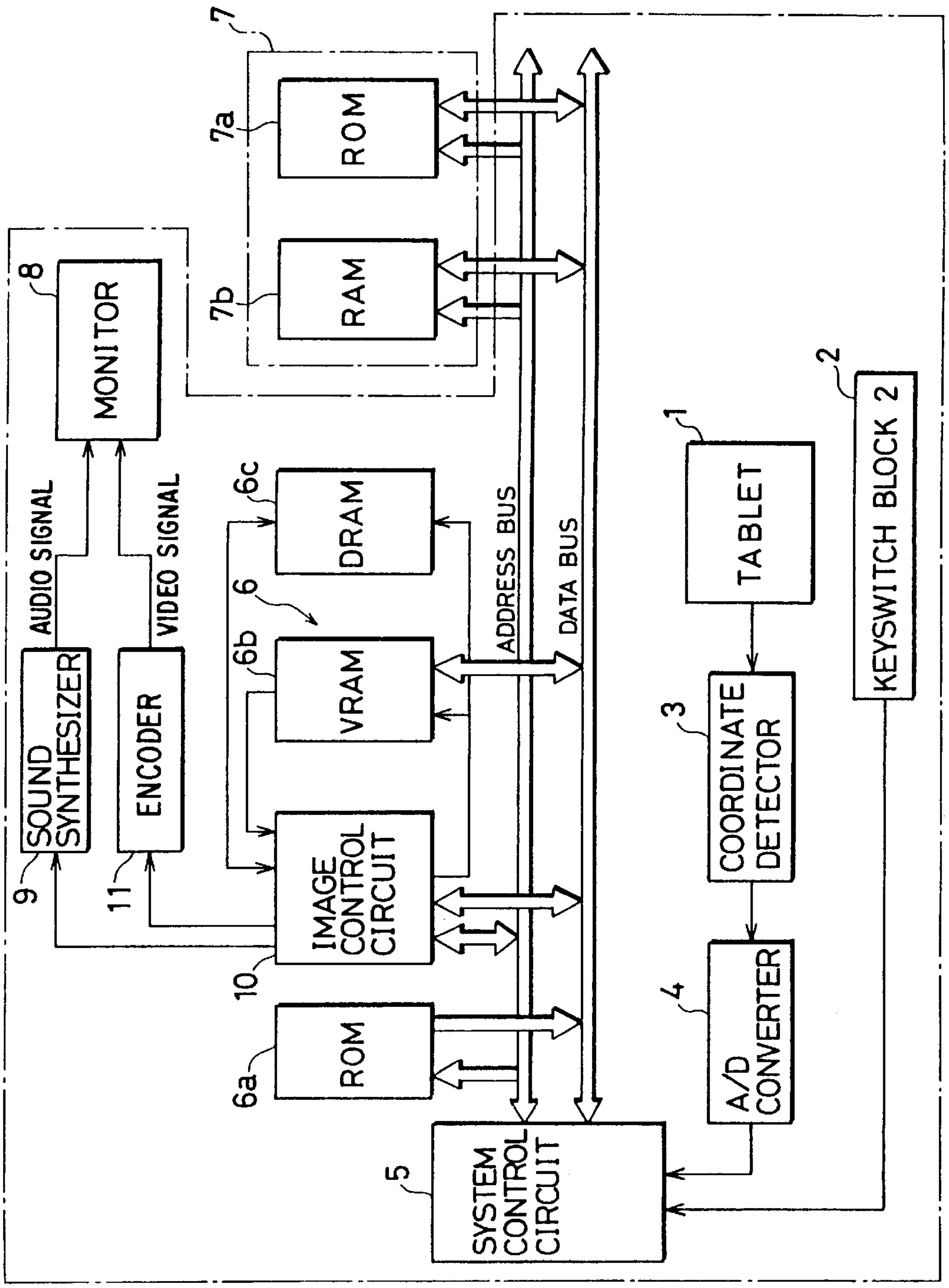
FIG. 1 is a block diagram of an image creation apparatus according to an embodiment of the invention.
Figure 2:
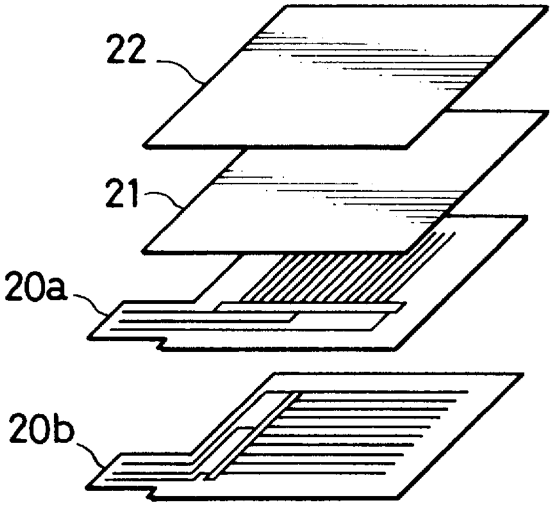
FIG. 2 is an exploded perspective view illustrating the construction of a tablet used in the image creation apparatus of the embodiment.
Figure 3:
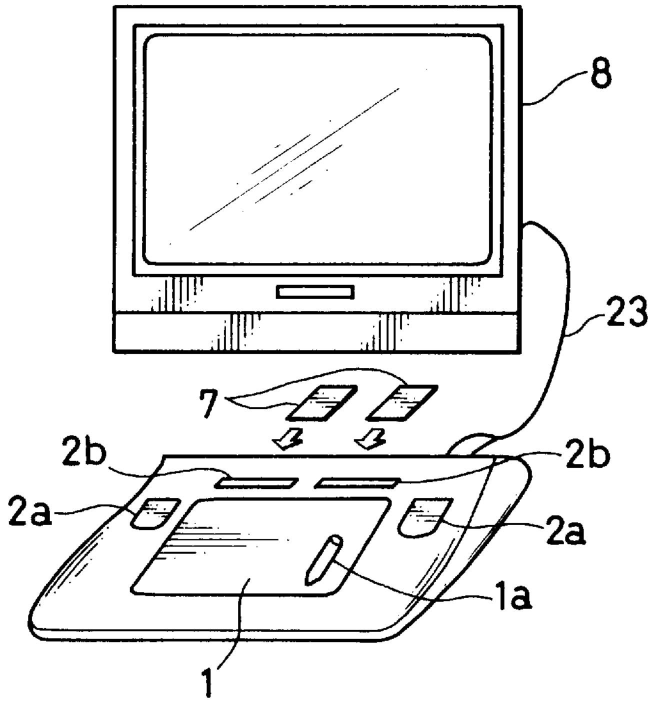
FIG. 3 is a diagram illustrating how the image creation apparatus is connected to a monitor.

FIG. 1 is a block diagram of an image creation apparatus according to the embodiment of the invention; FIG. 2 is an exploded perspective view illustrating the construction of a tablet 1 used in the image creation apparatus of the embodiment; and FIG. 3 is a diagram illustrating how the image creation apparatus of the embodiment is connected to a monitor 8. The image creation apparatus of the embodiment is essentially an upgraded version of a conventional image creation apparatus (a detailed description of the apparatus is omitted).

In FIGS. 1 to 3, the tablet 1 is a device for entering coordinates of specific locations on its surface designated by pressing with an input pen 1*a* or an equivalent pointing device. The tablet 1 comprises, as shown in FIG. 2, an X-coordinate sensing sheet 20*a*, a Y-coordinate sensing sheet 20*b*, a spacer (not shown in FIG. 2) placed therebetween for insulating both sensing sheets, a protective sheet 21 and a decorative top sheet 22. When any point on the top surface of the tablet 1 (i.e., the surface of the decorative top sheet 22) is pressed with the input pen 1*a*, the X-coordinate sensing sheet 20*a* and Y-coordinate sensing sheet 20*b* come into contact with each other at the same geometrical point and conduction occurs therebetween. As a result, the tablet 1 outputs respective resistance values in X-Y coordinate system according to a contact point between the X-coordinate sensing sheet 20*a* and Y-coordinate sensing sheet 20*b*.

The tablet 1 of the embodiment has an image editing area and an icon area provided at an appropriate location near the image editing area, and a later-described system control circuit 5 (or a member of a image creator) determines whether an output from the tablet 1 is position information for image generation or icon positioning information.

Designated by the numeral 2 is a keyswitch block which includes, according to the present embodiment, confirmation keys 2*a* used for deciding upon specific operations to be performed and function keys 2*b* used for choosing desired functions. Switch signals output from these keys are entered into the system control circuit 5. In the image creation apparatus of the embodiment, each entry of coordinates specified by the input pen 1*a* on the tablet 1 is confirmed by operating one of the confirmation keys 2*a*. As shown in FIG. 3, there is provided one each confirmation key 2*a* at appropriate positions on the right and left sides of the tablet 1 for the convenience of both right- and left-handed operators.

There exists such functions as a pen mode function activated when drawing a line in a desired color on the later-described monitor 8 in accordance with coordinate data entered through the tablet 1, a paint mode function activated when filling a specified portion of an on-screen image with a desired color, a color select function activated when choosing a color to be used in the pen mode or paint mode function, for instance, a stamp function used for outputting a dot pattern representing a graphic image readily stored in a later-described ROM 6*a* or a program ROM card 7*a* at a desired on-screen location, and an image data file editing function used for saving a graphic image produced by an operator in such a storage medium as a program RAM card 7*b*, reading out a previously saved graphic image, deleting part of such a previously saved graphic image, or displaying a list of already saved graphic images. The functions listed in the above are selected in accordance with operator inputs through the function keys 2*b* of the keyswitch block 2 and the icon area 1*b* of the tablet 1.

Referring to FIG. 1, designated by the numeral 3 is a coordinate detector for converting the resistance value output from the tablet 1 into an analog value. More particularly, the coordinate detector 3 causes a constant current to flow into the tablet 1, acquires an analog voltage which is proportional to the resistance value of the tablet 1, and outputs a coordinate signal in the form of analog voltage. Designated by the numeral 4 is an analog-to-digital converter (hereinafter referred to as the A/D converter) which converts the analog voltage signal received from the coordinate detector 3 into a digital signal and outputs it to the system control circuit 5.

Designated by the numeral 6 is a built-in program block contained in a main body of the image creation apparatus. The built-in program block 6 includes internal ROM 6*a*, internal VRAM 6*b* and an internal DRAM 6*c*. Designated by the numeral 7 is a program card block which includes the aforementioned program ROM card 7*a* and program RAM card 7*b*. In this embodiment, the program card block 7 employs an IC card or a memory card constructed in the form of plug-in modules as shown in FIG. 3. The internal ROM 6*a* and program ROM card 7*a* store an image generation program which enables ordinary on-screen image production, an image generation program which assists in producing images featuring a certain story, an entertainment program employing image generating functions, and necessary image production data and sound data. A detailed discussion of the program ROM card 7*a* will be given later in this description of the preferred embodiment.

Including a central processing unit (hereinafter referred to as the CPU), the system control circuit 5 performs transmission and reception of the image generation programs and data to and from the internal ROM 6*a* and VRAM 6*b* of the built-in program block 6, the program ROM card 7*a* and program RAM card 7*b* of the program card block 7 as well as a later-described image control circuit 10 through an address bus and a data bus. The system control circuit 5 executes various operations required for generating graphic images in accordance with the coordinate signals received from the tablet 1 and the switch signals entered from the keyswitch block 2 based on the image generation programs and associated routines. Image data thus produced is written in appropriate memory locations in the internal VRAM 6*b* for subsequent on-screen presentation.

The image control circuit 10 generates synchronizing pulses at specific pulse repetition intervals (e.g., 1/60 second) for controlling on-screen presentation. Data contents of the internal VRAM 6*b* are synchronously transmitted to the external monitor 8 by way of a later-described encoder 11. In this embodiment, the image control circuit 10 (or a member of a image creator) serves also as an interface circuit for a sound synthesizer 9 which is described below.

The sound synthesizer 9 receives sound data from the internal ROM 6*a* and program ROM card 7*a* (also referred to as a dot pattern data memory) via the image control circuit 10, coverts the sound data into an audio signal and outputs it to the monitor 8. The encoder 11 converts display image data received from the image control circuit 10 into a video signal and outputs it to the monitor 8. The output signals from the sound synthesizer 9 and encoder 11 are delivered to the monitor 8 via a video cable 23 shown in FIG. 3.

Figures 4A, 4B:
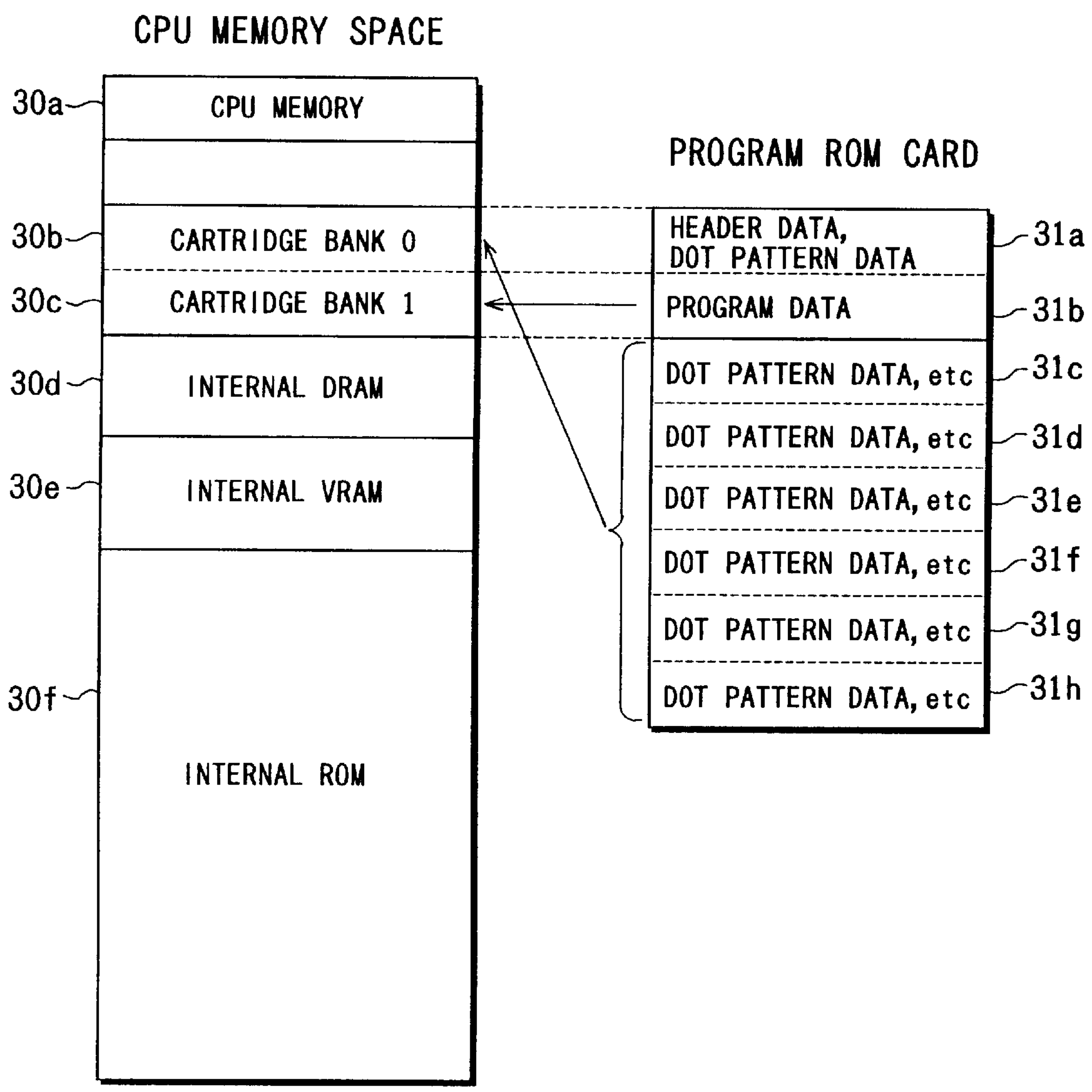
FIG. 4A is a memory map illustrating address space allocation of a system control circuit.
FIG. 4B is a memory map illustrating address space allocation of a program ROM card.

FIG. 4A is a memory map illustrating the allocation of an address space controllable by the system control circuit 5 while FIG. 4B is a memory map illustrating the allocation of an address space of the program ROM card 7*a*.

The address space of the system control circuit 5 includes, from its lower addresses, an internal memory area 30*a* of the CPU, two memory banks (i.e., cartridge banks 0 and 1) 30*b* and 30*c* to which specific memory areas in the program ROM card 7*a* are allocated by using a conventional bank-switching technique, a memory area 30*d* to which the internal DRAM 6*c* is allocated, a memory area 30*e* to which the internal VRAM 6*b* (also referred to as a video memory) is allocated, and a memory area 30*f* to which the internal ROM 6*a* is allocated, as shown in FIG. 4A.

On the other hand, the address space of the program ROM card 7*a* includes, from its lower addresses, a plurality of memory areas 31*a* to 31*h* (eight in total in this embodiment). The first memory area 31*a* stores so-called header data which is used when the program card block 7 has been inserted into the main body of the image creation apparatus for checking the card type and verifying whether the card is authentic or an illegal copy product as well as later-described screen data and dot pattern data. The second memory area 31*b* stores the aforementioned image generation programs and entertainment program. The dot pattern data can be, in its simple manner, classified into two kinds; they are common dot pattern data and uncommon dot pattern data. The common dot pattern data can be used as many times as it is required to create the image on the screen of the display device. While uncommon dot pattern data is only used once to be written in the video memory as its pattern is unique. Stored in the third to eighth memory areas 31*c*–31*h* are the screen data, dot pattern data and sound data. The image generation programs and entertainment program contain an address table which makes it possible to determine in which addresses of the memory areas 31*a* and 31*c*–31*h* specific dot pattern data and screen data are stored. It should be noted that the screen data providing the information of the arrangement of the dot pattern data onto the video memory to create a desired image on the screen can be alternatively stored in the second memory area 31*b* of the program ROM card 7*a*.

In this embodiment, the second memory area 31*b* of the program ROM card 7*a*, or a program area, is always allocated to cartridge bank 1 (30*c*) of the system control circuit 5 while one of the first and third to eighth memory areas 31*a*, 31*c*–31*h*, or a data area specified by the image generation programs and entertainment program is allocated to cartridge bank 0 (30*b*).

Figure 5:
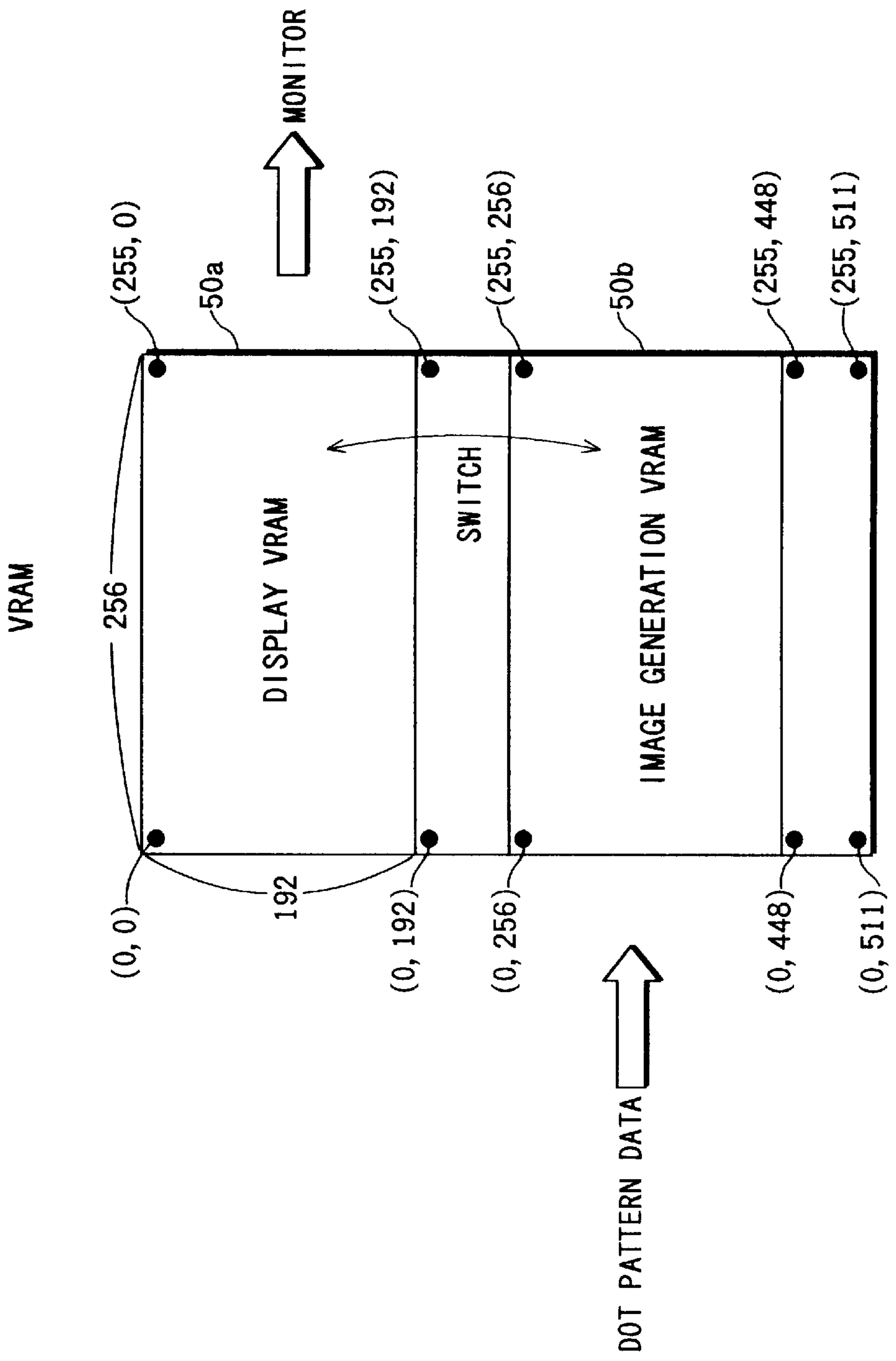
FIG. 5 is a memory map of an internal VRAM of the embodiment.

FIG. 5 is a memory map of the internal VRAM 6*b*. In the image creation apparatus of the embodiment, images are displayed by use of a so-called double-buffering technique.

The internal VRAM 6*b* is a bit-map type VRAM having an address space corresponding to an area of 512 (vertical) by 256 (horizontal) pixels of the screen of the monitor 8 with a unique address assigned to each of these pixels, as shown in FIG. 5. In this embodiment, the entire address space of the internal VRAM 6b is divided into halves, and a ¾ portion of each half is used as a display data area. Accordingly, the internal VRAM 6b contains two display data areas 50a and 50b, each corresponding to an area of 192 (vertical) by 256 (horizontal) pixels.

One display data area (50a in the illustrated example) is used as a display VRAM area, from which the image control circuit 10 reads out image data and sends it to the monitor 8 at specified time intervals (e.g., 1/60 second). The other display data area (50b in the illustrated example) is used as an image generating VRAM area, into which dot pattern data is directly written by a later-described control sequence in accordance with a command given from the system control circuit 5. Each time a synchronizing pulse is output from the image control circuit 10, a judgment is made to determine whether writing of the dot pattern data into the image generating VRAM area 50b has been completed. If the judgment result is in the affirmative, the display data area 50a is reassigned as the display VRAM area while the display data area 50b is reassigned as the image generating VRAM area.

Note that the image control circuit 10 includes a reader for reading the dot pattern data from the dot pattern data memory and the control circuit 5 includes a writer for writing the dot pattern data read by the image control circuit 10 in appropriate addresses in the video memory. And the image control circuit 10 and the control circuit 5 together constitute an image creator.

Figure 6:
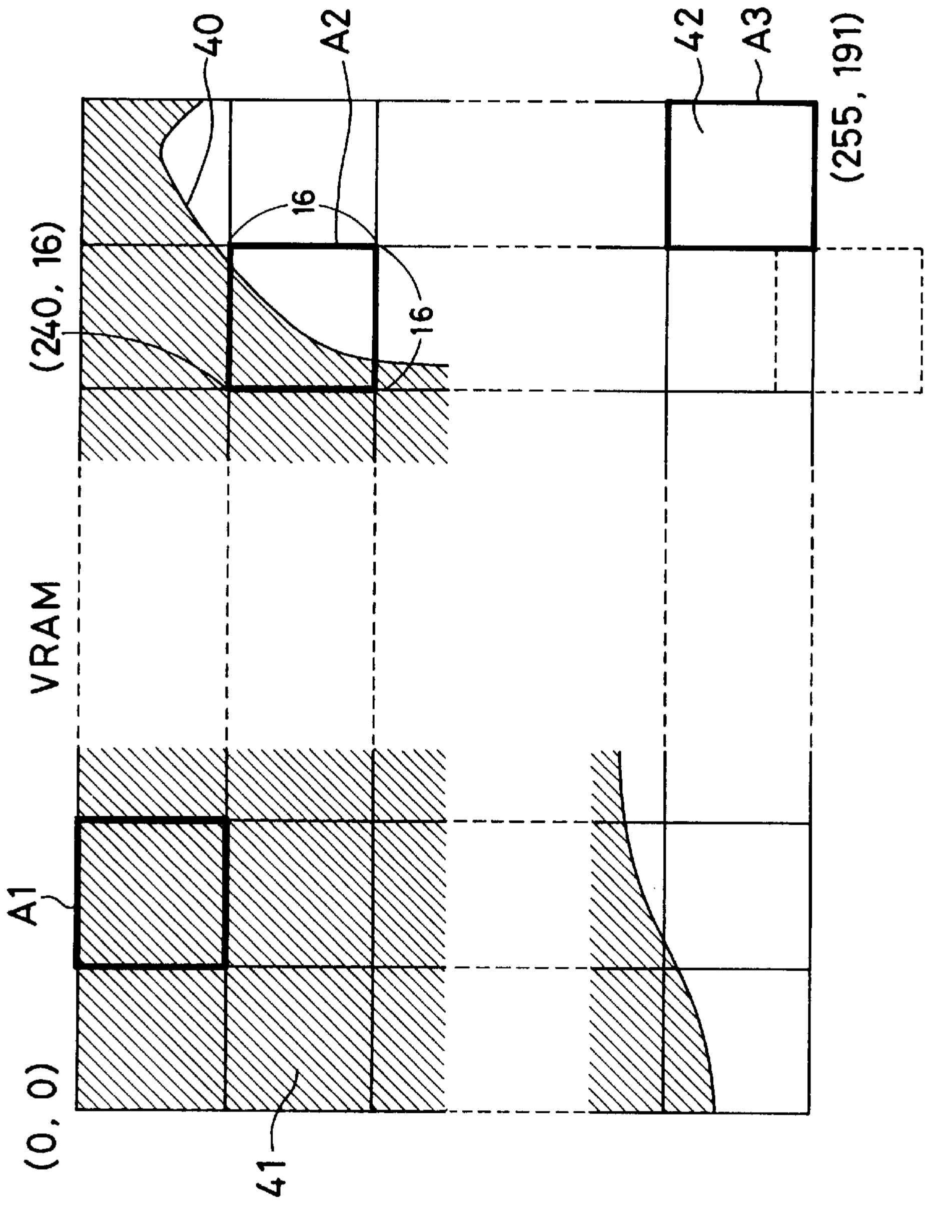
FIG. 6 is a diagram illustrating a relationship between an image produced by the image creation apparatus and the internal VRAM.

FIG. 6 is a diagram illustrating a relationship between an image produced by the image creation apparatus of the embodiment and the display data areas 50a and 50b of the internal VRAM 6b. An example of dot pattern data stored on the program ROM card 7a (or a dot pattern data memory) is now described with reference to FIG. 6.

The second memory area 31b of the program ROM card 7a stores programs for producing a marine chart like the one shown in FIG. 6. In the illustrated example, the chart is divided by a coastline 40 into a land area 41 and a water area 42. The land area 41 is presented in uniform green (hatched in FIG. 6) while the water area 42 is presented in uniform blue (white in FIG. 6), for example. Shown in FIG. 6 is just part of data stored on the program ROM card 7a and the data actually covers a larger extent of area extending up and down and to the right and left of the illustrated chart area. The on-screen chart area can be scrolled up and down and to the right and left in accordance with commands given by the image generation programs or entertainment program.

The whole dot pattern data stored on the program ROM card 7a for producing the chart is a group of color specification data sets (A1, A2, A3, etc. shown in FIG. 6) corresponding to individual area segments, in which one color specification data set covering a single area segment contains color information for 16 (vertical) by 16 (horizontal) pixels. Accordingly, an entire image displayed on the screen of the monitor 8 is created in a matrix composed of 12 rows by 16 columns of dot pattern data. The system control circuit 5 writes the individual dot pattern data in specific addresses of the internal VRAM 6b in accordance with the screen data stored on the program ROM card 7a while switching write locations in accordance with commands given by the image generation programs and entertainment program.

The chart to be displayed on the screen of the monitor 8 is essentially a two-tone pattern covering a large area, in which the land area 41 and water area 42 are painted in their respective monotone colors. Accordingly, area segments containing pixels to be painted in a single color are assigned a common dot pattern data whereas area segments containing part of the coastline 40 are assigned their respective dot pattern data (e.g., A2 referred as uncommon dot pattern data) in this embodiment. In other words, a single dot pattern data (e.g., A1 referred as common dot pattern data) is shared by all area segments that contain green pixels only representative of the land area 41 while another single dot pattern data (e.g., A3 referred as common dot pattern data) is shared by all area segments that contain blue pixels only representative of the water area 42. More particularly, the program ROM card 7a stores a pair of dot pattern data A1 and A3 as well as a specified number of dot pattern data assigned to the area segments containing parts of the coastline 40. The system control circuit 5 writes the dot pattern data A1 and A3 containing single-color pixels for the land area 41 and water area 42, respectively, in appropriate addresses of the internal VRAM 6b as many times as necessary to produce a desired chart for on-screen presentation on the monitor 8. Furthermore, coastline shapes may be standardized, or classified, to a limited number of line patterns to reduce the number of dot pattern data required for producing the coastline 40.

Figure 7:
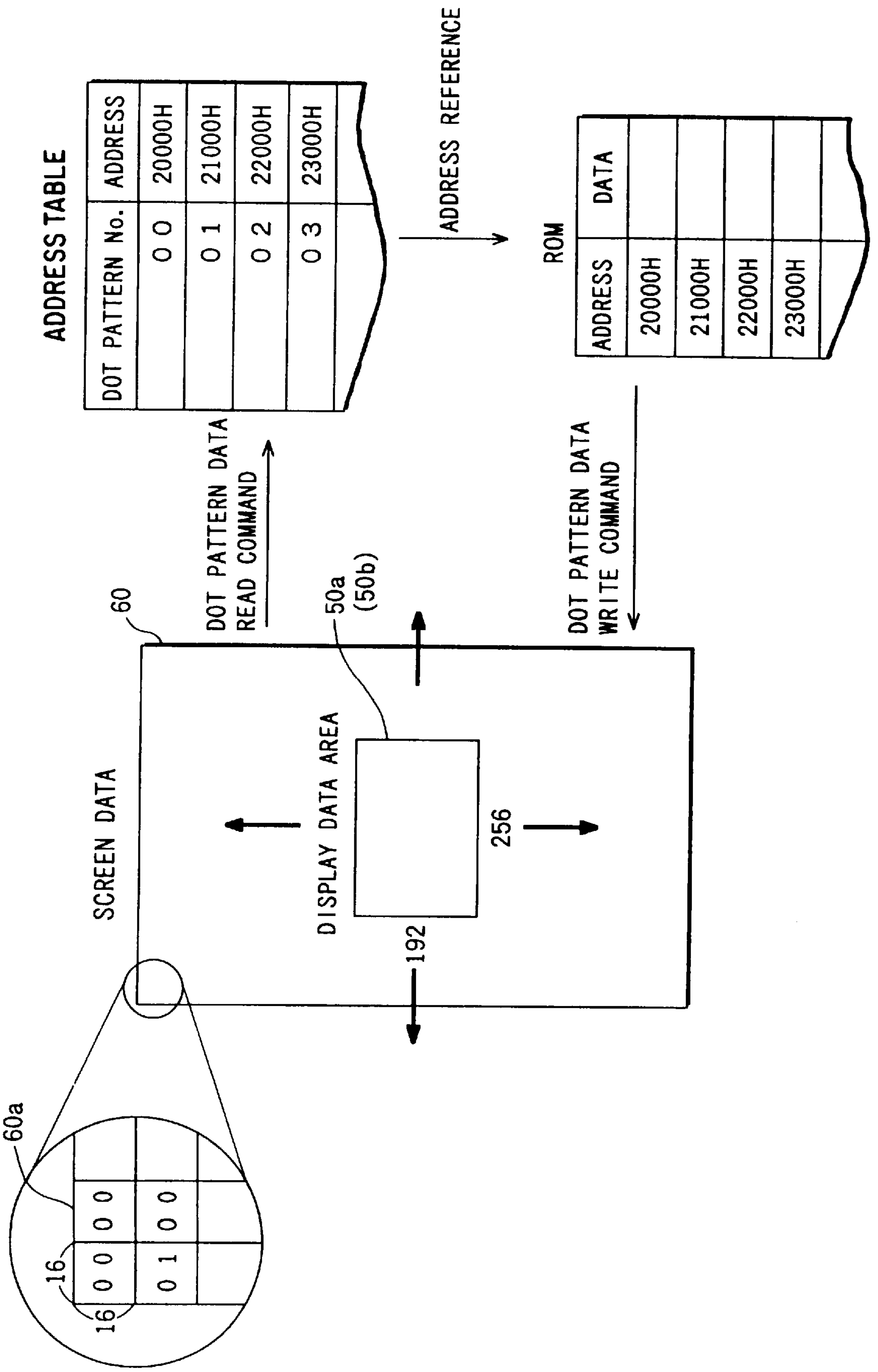
FIG. 7 is a diagram illustrating a relationship between screen data and dot pattern data of the embodiment.

FIG. 7 is a diagram illustrating a relationship between the screen data and dot pattern data. An example of the screen data stored on the program ROM card 7a is now described with reference to FIG. 7.

A whole area 60 that can be controllably displayed by the image generation programs is divided into subareas 60a, each corresponding to a matrix 16 pixels wide by 16 pixels high in this embodiment, as shown in FIG. 7. The screen data stored on the program ROM card 7a defines a relationship between the individual subareas 60a and dot pattern data. In other words, the screen data specifies dot pattern data to be written in the individual subareas 60a. In this embodiment, the individual dot pattern data stored are assigned unique dot pattern numbers ("00", "01", etc. as shown in the illustrated example) for their identification.

Assuming the display data area 50a (or 50b) is located at a particular position within the whole area 60, that part of the screen data which exists within the display data area 50a (or 50b) is sequentially read out from, for instance, upper-left memory location (as illustrated in FIG. 7). The system control circuit 5 makes a reference to the address table (of which example is shown in FIG. 7) stored on the program ROM card 7a and recognizes in which address of the memory areas 31a and 31c–31h a dot pattern data designated by each dot pattern number is stored. The system control circuit 5 then reads out the proper dot pattern data stored in the identified address of the program ROM card 7a and writes the same in a corresponding location within the image generating VRAM area (50b as illustrated in FIG. 5) of the internal VRAM 6b.

Due to limitations in the storage capacity of the program ROM card 7a, the dot pattern data and screen data are compressed by using a conventional data compression technique when they are stored on the program ROM card 7a. The data on the program ROM card 7a is decompressed before use, as will be discussed later.

Figure 8:
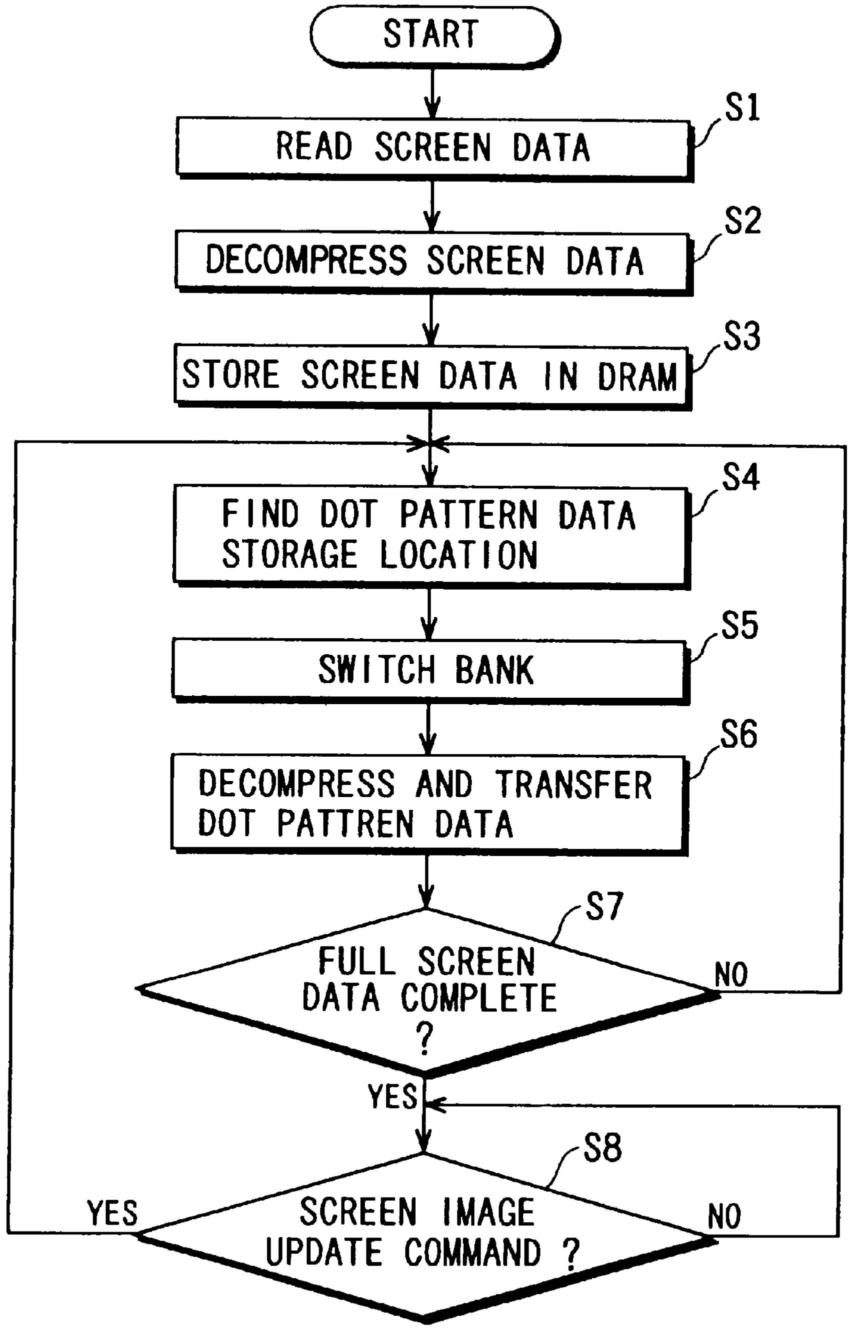
FIG. 8 is a flowchart showing an operational sequence of image creation apparatus.

Operation of the image creation apparatus is now described focusing on its main operational features with reference to the flowchart of FIG. 8 in conjunction with FIGS. 1 to 7.

When the image creation apparatus is powered on with the program ROM card 7a inserted in its main body, program data stored on the program ROM card 7a is allocated to cartridge bank 1 (30c) of the system control circuit 5 and the following operational sequence is executed in accordance with the program data held in the memory area 30*f* to which the internal ROM 6*a* is allocated and cartridge bank 1.

A chart is displayed in succession to a start-up logo screen following the sequence described below. Specifically, when a screen data read command is issued in step S1, compressed screen data stored in one of the memory areas 31*a* and 31*c*–31*h* of the program ROM card 7*a* is read out. Since the screen data read in step S1 covers the whole area 60 that can be displayed on the screen as already stated, it is not read again until a different image generation program stored on the program ROM card 7*a* is run. The screen data is decompressed in step S2 and the decompressed screen data is stored in the internal DRAM 6*c* in step S3.

In step S4, a dot pattern data needed for creating an on-screen image is identified based on the screen data stored in the internal DRAM 6*c*, and the address table is checked through to determine in which one of the memory areas 31*a* and 31*c*–31*h* of the program ROM card 7*a* the dot pattern data thus identified is stored. In step S5, one of the memory areas 31*a* and 31*c*–31*h* in which the dot pattern data is stored is allocated to cartridge bank 1 (30*c*). Instep S6, the dot pattern data in its compressed state is read through cartridge bank 1 (30*c*), decompressed and transferred to appropriate addresses of the internal VRAM 6*b*.

In step S7, it is judged whether dot pattern data for a full-screen area have been written in the internal VRAM6*b*. The operation flow proceeds to step S8 if the judgment result is in the affirmative, whereas the operation flow returns to step S4 for identifying another dot pattern data if the judgment result is in the negative.

When a full-screen image has been completed, the system control circuit 5 is set to a standby status and waits for a screen image update command for vertical or horizontal scroll operation, for instance, in step S8. When a screen image update command has been issued, the operation flow returns to step S4 and the foregoing sequence (steps S4 to S8) is re-executed. The screen image update command causes dot pattern data needed for updating the on-screen image to be overwritten as appropriate, and an updated image is displayed on the screen of the monitor 8.

If the on-screen image is scrolled in steps of the width, or height, of one area segment in which a single dot pattern data (containing 16×16 pixels) just fits, an updated image containing 12 (vertical) by 16 (horizontal) dot pattern data will be properly displayed. If the amount of image shift is not a multiple of the width, or height, of an area segment, some of the dot pattern data may not be fully displayed as shown by short dashed lines in FIG. 6, requiring a larger number of dot pattern data to complete a full-screen image. It is, however, possible in this embodiment to present the dot pattern data at an arbitrary on-screen position (as shown by short dashed lines in FIG. 6, for example) because the dot pattern data and screen data are written in the internal VRAM 6*b* through a software-driven process.

A chart as shown in FIG. 6 is displayed on the screen of the monitor 8 through the above-described operational sequence. As will be recognized from the foregoing discussion, the image creation apparatus of the embodiment handles the dot pattern data in units of discrete data sets when writing data for image generation into the bit-map type internal VRAM 6*b*. As already mentioned, area segments of the chart painted in a single uniform color share a common dot pattern data (A1 or A3 in FIG. 6). This arrangement makes it possible to reduce the number of dot pattern data to be stored on the program ROM card 7*a*. This in turn serves to increase the number of dot pattern data storable on the program ROM card 7*a* so that a greater variety of images or an image having an increased area coverage can be displayed.

Furthermore, the aforementioned embodiment remarkably simplifies control operation required for image generation and reduces burden on software compared to the conventional arrangement in which colors are specified for individual pixels.

While the invention has been illustrated with respect to specific embodiment thereof, the embodiment should be considered as illustrative rather than limiting. Various modifications and additions may be made and will be apparent to those skilled in the art without departing from the spirit and scope of the present invention. Accordingly, the invention should not be limited by the foregoing description but rather should be defined only by the following claims.

What is claimed is:

1. An image creation apparatus for driving a display device having a screen with a plurality of pixels arranged in matrix form, said image creation apparatus comprising:

a bit-mapped video memory having addresses corresponding to the individual pixels of said display device;

a dot pattern data memory for storing common dot pattern data of each of a plurality of common dot patterns formed of a plurality of pixels, the dot pattern data memory storing the common dot pattern data in a compressed state;

an image creator for reading the common dot pattern data in units of the common dot patterns from the dot pattern data memory and writing decompressed common dot pattern data into the bit-mapped video memory in accordance with a predetermined image creation program to create an image on the screen of the display device, the image creator including:

a reader for reading the common dot pattern data in the compressed state; and a writer for writing the decompressed common dot pattern data derived from the common dot pattern data read from the dot pattern data memory into the bit-mapped video memory, the writer including a decompression means for decompressing the common dot pattern data read by the reader into the decompressed common dot pattern data; and means for applying the decompressed common dot pattern data written in the bit-mapped video memory to the display device.

2. An image creation apparatus according to claim 1, wherein the dot pattern data memory further stores arrangement data indicating a storing arrangement of the common dot pattern data and the reader for reading the common dot pattern data from the dot pattern data memory reads in accordance with the arrangement data.

3. An image creation apparatus according to claim 2, wherein the image creation program includes screen data indicating at which addresses in the bit-mapped video memory the decompressed common dot pattern data of the common dot patterns are to be written and the writer writes the common dot pattern data in the bitmapped video memory in accordance with the screen data.

4. An image creation apparatus according to claim 1, wherein the arrangement data includes dot pattern address data designating addresses in which the common dot pattern data of the common dot patterns are stored.

5. An image creation apparatus according to claim 1, wherein the dot pattern data memory is in the form of a replaceable storage member.

6. An image creation apparatus according to claim 4, wherein the replaceable storage member is an IC memory card.

7. An image creation apparatus according to claim 1, wherein the reader reads the common dot pattern data of one of the common dot patterns from the dot pattern data memory at least twice in an event that the common dot pattern data of the one of the common dot patterns is repeatedly written in the bit-mapped video memory in accordance with the screen data for a screen display.

8. An image creation apparatus according to claim 1, wherein the dot pattern data memory further stores uncommon dot pattern data and the common dot pattern data of one of the common dot patterns is read more than twice and the uncommon dot pattern data is read once in accordance with the screen data for a screen display.

9. An image creation apparatus according to claim 8, wherein the common dot pattern forms n×n pixels where n is an integer more than 2.

10. An image creation apparatus according to claim 9, wherein the integer n is 16.

11. An image creation apparatus according to claim 1, wherein the common dot pattern data is repeatedly used data to create an image including at least a portion consisting of a plurality of segments identical with respect to each other displayed on the display device.

* * * * *